Patented Sept. 1, 1953

2,650,930

UNITED STATES PATENT OFFICE 2,650,930

PROCESS FOR THE MANUFACTURE OF BROMO-CHOLADIENES

Karl Miescher, Riehen, Albert Wettstein, Basel, and Jules Heer, Binningen, Switzerland, assignors to Ciba Pharmaceutical Products, Inc., Summit, N. J.

No Drawing. Application October 23, 1952, Serial No. 316,552. In Switzerland December 20, 1951

4 Claims. (Cl. 260—397.4)

This invention relates to a new process for the manufacture of $\Delta^{20,23}$-21-bromocholadienes.

Various processes are already known for the manufacture of $\Delta^{20,23}$-21-bromocholadienes. Thus for example $\Delta^{23}$-24,24-diaryl-cholenes may be treated with bromo-dicarboxylic acid imides and from the 22-bromo-compounds thus formed, hydrogen bromide then split off. Subsequently the $\Delta^{20,23}$-choladienes obtained are again reacted with bromo-dicarboxylic acid imides. In this process, in order to obtain good yields, it is preferable to operate with irradiation by light.

The present invention is concerned with a process according to which $\Delta^{20,23}$-21-bromocholadienes are obtained in good yield from $\Delta^{23}$-24,24-diaryl-cholenes in one, instead of in three, stages. The process of the invention consists in that the specified substances are reacted with N-bromo-dicarboxylic acid imides, such as N-bromophthalimide, N-bromo-parabanic acid or especially with N-bromo-succinimide, in the presence of unsaturated aliphatic hydrocarbon halides, such as unsaturated lower aliphatic hydrocarbon halides, e. g. substituted or unsubstituted allyl halides or haloethylenes, preferably allyl bromide. Of especial advantage in the case of the new process is the fact that in order to obtain good yields it is not necessary to operate with irradiation by light. The $\Delta^{23}$-24,24-diaryl-cholenes used as starting materials can be of any suitable configuration and may also contain further substituents. Preferably at least two equivalents of N-bromo-dicarboxylic acid imide are used.

The following examples illustrate the invention, the relation between parts by weight and parts by volume being the same as that between the gram and cubic centimeter:

Example 1

13 parts by weight of $\Delta^{23}$-3α-acetoxy-11-keto-12-bromo-24,24-diphenyl-cholene are dissolved in 100 parts by volume of allyl bromide and the whole heated to 60-65° C. Thereupon 8 parts by weight of N-bromo-succinimide are added and stirring carried out for 10 minutes with heating to the boiling point of the solvent, whereby the N-bromo-succinimide passes into solution. Thereupon the whole is cooled, filtered from precipitated succinimide and the filtrate considerably evaporated under vacuum. After treatment with 50 parts by volume of ether, 10.2 parts by weight of the $\Delta^{20,23}$-3α-acetoxy-11-keto-12,21-dibromo-24,24-diphenyl-choladiene of M. P. 225-228° C. crystallise out.

Example 2

13 parts by weight of $\Delta^{23}$-3α-acetoxy-11-keto-12-bromo-24,24-diphenyl-cholene are dissolved in 130 parts by volume of tetrachlorethylene ($CCl_2$=$CCl_2$) and heated to 90-95° C. 8 parts by weight of N-bromo-succinimide are then added while stirring. After about 10 minutes the reaction is complete. The solution is cooled, the precipitated succinimide is separated by filtering with suction and the filtrate evaporated to dryness under reduced pressure. Finally, the residue is dissolved in 30-40 parts by volume of glacial acetic acid. After some standing, $\Delta^{20,23}$-3α-acetoxy-11-keto-12,21-dibromo-24,24-diphenyl-choladiene crystallizes out. It melts at 225° C.

Example 3

6.3 parts by weight of $\Delta^{23}$-3α-acetoxy-11-keto-12-bromo-24,24-diphenyl-cholene are dissolved in 10 parts by volume of trichloroethylene and, after the addition of 4 parts by weight of N-bromo-succinimide heated for 15 minutes under reflux. As described in Example 1, the reaction solution is evaporated after the removal of the succinimide and the residue recrystallized from glacial acetic acid or ether. The resultant $\Delta^{20,23}$-3α-acetoxy-11-keto-12,21-dibromo-24,24-diphenyl-choladiene melts at 225° C.

Example 4

1.2 parts by weight of $\Delta^{23}$-3α,12α-diacetoxy-24,24-diphenyl-cholene are dissolved in 10 parts by volume of allylbromide and admixed with 0.8 part by weight of N-bromosuccinimide. The reaction mixture is refluxed for 6 minutes, allowed to cool, and then the separating succinimide separated by filtration. The filtrate is then evaporated under reduced pressure and the brown residue dissolved in a mixture of 5 parts by volume of petroleum ether and 10 parts by volume of ether by moderate heating. After standing for some time, the $\Delta^{20,23}$-3α,12α-diacetoxy-21-bromo-24,24-diphenyl-choladiene of melting point 178–180° C. separates in the form of short needles.

What is claimed is:

1. Process for the preparation of $\Delta^{20,23}$-21-bromo-choladienes, which comprises reacting a $\Delta^{23}$-24,24-diaryl-cholene with an N-bromo-dicarboxylic acid imide in the presence of an unsaturated aliphatic hydrocarbon halide.

2. Process for the preparation of $\Delta^{20,23}$-21-bromo-choladienes, which comprises reacting a $\Delta^{23}$-24,24-diaryl-cholene with an N-bromo-dicarboxylic acid imide in the presence of allyl bromide.

3. Process for the preparation of $\Delta^{20,23}$-21-bromo-choladienes, which comprises reacting a $\Delta^{23}$-24,24-diaryl-cholene with an N-bromo-dicarboxylic acid imide in the presence of trichlorethylene.

4. Process for the preparation of $\Delta^{20,23}$-21-bromo-choladienes, which comprises reacting $\Delta^{23}$-24,24-diaryl-cholene with an N-bromo-dicarboxylic acid imide in the presence of tetrachlorethylene.

KARL MIESCHER.
ALBERT WETTSTEIN.
JULES HEER.

No references cited.